US012571557B2

(12) United States Patent
Ashizawa et al.

(10) Patent No.: US 12,571,557 B2
(45) Date of Patent: Mar. 10, 2026

(54) AIR CONDITIONING VENTILATION SYSTEM

(71) Applicant: DAIKIN INDUSTRIES, LTD., Osaka (JP)

(72) Inventors: Tomoharu Ashizawa, Osaka (JP); Teruo Nishida, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 507 days.

(21) Appl. No.: 18/108,934

(22) Filed: Feb. 13, 2023

(65) Prior Publication Data

US 2023/0194117 A1 Jun. 22, 2023

Related U.S. Application Data

(63) Continuation of application No. PCT/JP2021/036037, filed on Sep. 30, 2021.

(30) Foreign Application Priority Data

Sep. 30, 2020 (JP) ................................. 2020-165292

(51) Int. Cl.
| | |
|---|---|
| *F24F 11/65* | (2018.01) |
| *F24F 11/00* | (2018.01) |
| *G05B 19/042* | (2006.01) |
| *F24F 110/12* | (2018.01) |
| (Continued) | |

(52) U.S. Cl.
CPC .......... *F24F 11/65* (2018.01); *F24F 11/0001* (2013.01); *G05B 19/042* (2013.01); *F24F 2011/0002* (2013.01); *F24F 2110/12*

(2018.01); *F24F 2110/22* (2018.01); *F24F 2110/70* (2018.01); *G05B 2219/2614* (2013.01)

(58) Field of Classification Search
CPC .... F24F 11/65; F24F 11/0001; F24F 2110/70; F24F 2110/22; F24F 2110/12; F24F 2011/0002; B05B 19/042; B05B 2219/2614
See application file for complete search history.

(56) References Cited

U.S. PATENT DOCUMENTS

2018/0087792 A1 3/2018 Takeda et al.

FOREIGN PATENT DOCUMENTS

| | | | |
|---|---|---|---|
| CN | 105864983 A | * | 8/2016 |
| EP | 2 945 105 A1 | | 11/2015 |
| JP | 2-133733 A | | 5/1990 |

(Continued)

OTHER PUBLICATIONS

Kobayashi, Air Conditioning System and Control Unit, Aug. 13, 2020, WO2020162306A1, Whole Document (Year: 2020).*

(Continued)

*Primary Examiner* — Larry L Furdge
(74) *Attorney, Agent, or Firm* — Spencer Fane LLP

(57) ABSTRACT

An air conditioning ventilation system includes an air conditioner, a ventilator, and a control unit. The control unit controls operations of the air conditioner and the ventilator. The control unit causes the air conditioner to perform a compensation operation in order to compensate for a change in at least one of indoor temperature and humidity due to a ventilation operation prior to the ventilation operation to be performed by the ventilator.

14 Claims, 5 Drawing Sheets

(51) Int. Cl.
*F24F 110/22* (2018.01)
*F24F 110/70* (2018.01)

(56) References Cited

FOREIGN PATENT DOCUMENTS

| | | | | |
|----|----|----|----|----|
| JP | 8-145432 | A | | 6/1996 |
| JP | 2000088320 | A | * | 3/2000 |
| JP | 2000-274825 | A | | 10/2000 |
| JP | 2014-135015 | A | | 7/2014 |
| JP | 2014-214905 | A | | 11/2014 |
| JP | 2017-3203 | A | | 1/2017 |
| JP | 2017-122563 | A | | 7/2017 |
| WO | 2017/017804 | A1 | | 2/2017 |
| WO | 2020/162306 | A1 | | 8/2020 |

OTHER PUBLICATIONS

Xu et al., Air Conditioner Control Method, Aug. 17, 2016, CN105864983A, Whole Document (Year: 2016).*
Watanabe, Automatic Ventilation System, Mar. 31, 2000, JP2000088320A, Whole Document (Year: 2000).*
Wan, Air Conditioner of Electric Car, Dec. 10, 2008, CN201161540Y, Whole Document (Year: 2008).*
European Search Report of corresponding EP Application No. 21 875 756.5 dated Feb. 12, 2024.
International Preliminary Report of corresponding PCT Application No. PCT/JP2021/036037 dated Apr. 13, 2023.
International Search Report of corresponding PCT Application No. PCT/JP2021/036037 dated Dec. 7, 2021.

* cited by examiner

AIR CONDITIONING VENTILATION SYSTEM

CROSS-REFERENCE TO RELATED APPLICATIONS

This is a continuation of International Application No. PCT/JP2021/036037 filed on Sep. 30, 2021, which claims priority to Japanese Patent Application No. 2020-165292, filed on Sep. 30, 2020. The entire disclosures of these applications are incorporated by reference herein.

BACKGROUND

Technical Field

The present disclosure relates to an air conditioning ventilation system.

Background Art

When a ventilation operation is performed by using a ventilator, there is a possibility that outside air supplied to an air conditioning target space along with ventilation may change temperature and humidity of air in the air conditioning target space.

To solve such a problem, there is conventionally known an air conditioner as disclosed in JP H08-145432 A that controls an air conditioning capacity according to a temperature of supplied outdoor air when the outdoor air is supplied to the air conditioning target space.

SUMMARY

An air conditioning ventilation system according to a first aspect includes an air conditioner, a ventilator, and a control unit. The control unit is configured to control operations of the air conditioner and the ventilator. The control unit is configured to cause the air conditioner to perform a compensation operation in order to compensate for a change in at least one of indoor temperature and humidity due to a ventilation operation prior to the ventilation operation to be performed by the ventilator.

DETAILED DESCRIPTION OF EMBODIMENT(S)

Embodiment

Hereinafter, an embodiment of an air conditioning ventilation system of the present disclosure will be described with reference to the drawings as appropriate. However, unnecessarily detailed description may be omitted. For example, a detailed description of already well-known matters and duplicate description of substantially the same configuration may be omitted. This is to avoid unnecessary redundancy of the following description and to facilitate understanding of those skilled in the art.

Each drawing is not necessarily strictly illustrated. In each drawing, substantially the same components are denoted by the same reference signs, and duplicate description is omitted or simplified.

First Embodiment

(1) Overall Configuration

Figure 1:
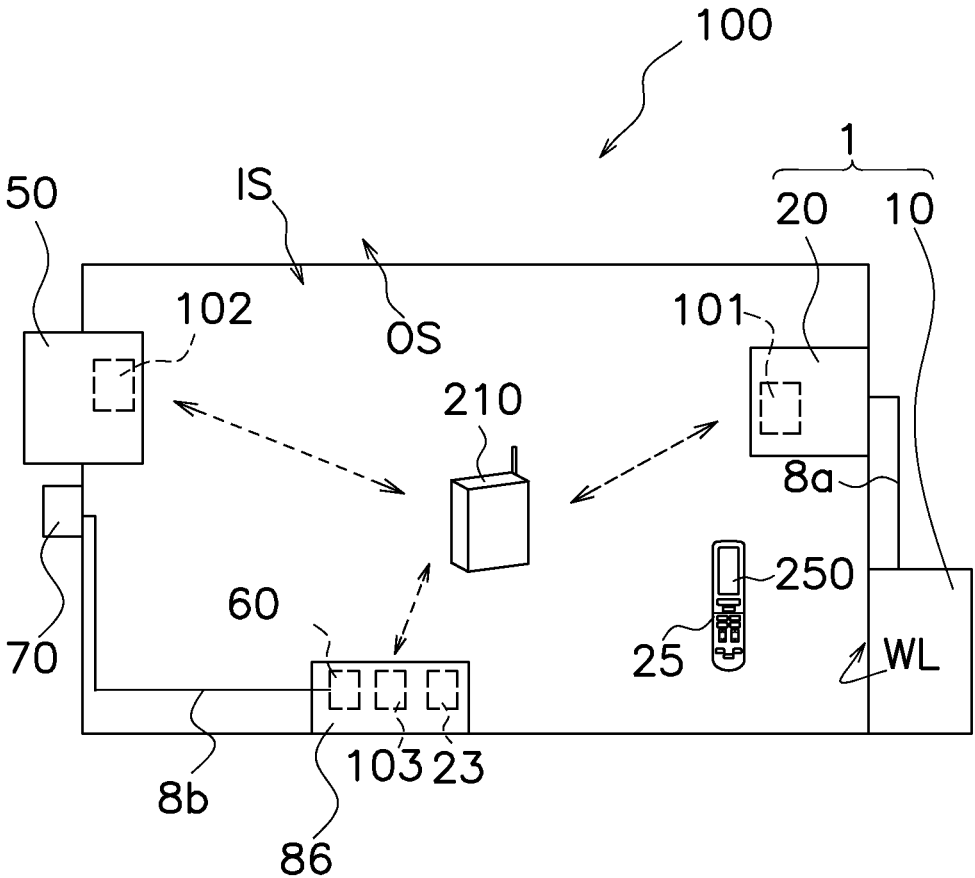
FIG. 1 is a schematic diagram of an air conditioning ventilation system.

First, an air conditioning ventilation system 100 will be described with reference to FIG. 1. FIG. 1 is a diagram schematically illustrating the air conditioning ventilation system 100 according to the embodiment. The air conditioning ventilation system 100 is a system that performs a compensation operation prior to a ventilation operation to moderate a temperature change in an indoor space IS (which corresponds to "indoor" described in the claims). The air conditioning ventilation system 100 mainly includes an air conditioner 1, a ventilator 50, an indoor environment sensor 60, and an outdoor sensor 70 (see FIG. 1). The air conditioner 1 is a device capable of performing the compensation operation. The ventilator 50 is a device capable of performing the ventilation operation. The indoor environment sensor 60 is a sensor unit capable of detecting environment of the indoor space IS. In the embodiment, the indoor environment sensor 60 is incorporated in a controller 86. The outdoor sensor 70 is a sensor unit capable of detecting an outdoor temperature.

In the embodiment, the air conditioner 1 includes a first wireless LAN adapter 101, the ventilator 50 includes a second wireless LAN adapter 102, and the controller 86 includes a third wireless LAN adapter 103. As a result, an air conditioning control unit 9, a ventilation control unit 77, and a control unit 5 described later can perform wireless communication via a wireless LAN router 210. The air conditioning control unit 9, the ventilation control unit 77, and the control unit 5 can mutually transmit and receive control signals, information, and the like by performing wireless communication.

(2) Detailed Configuration (2-1) Air Conditioner

Figure 2:
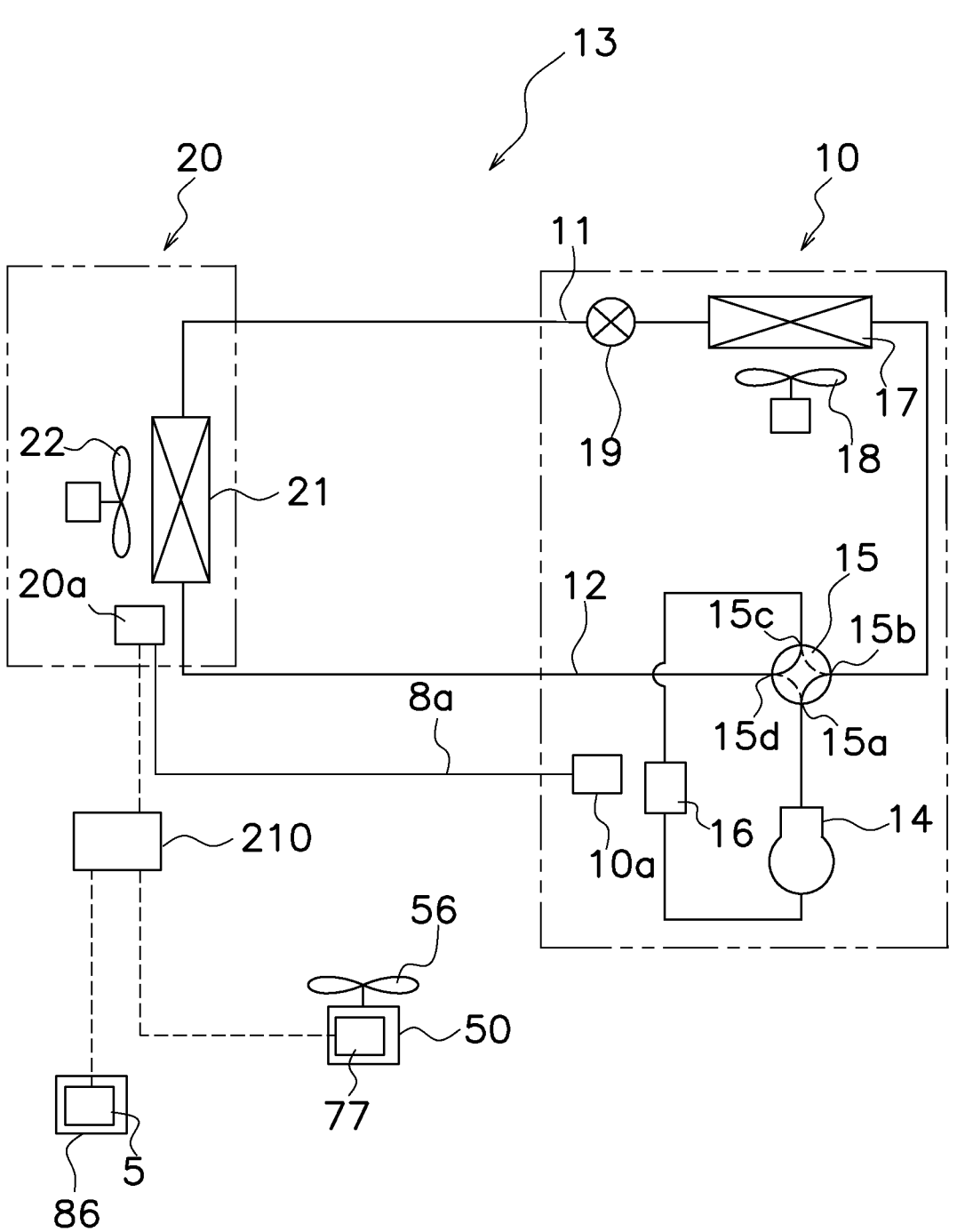
FIG. 2 is a diagram schematically illustrating an overall configuration of the air conditioning ventilation system.
Figure 3:
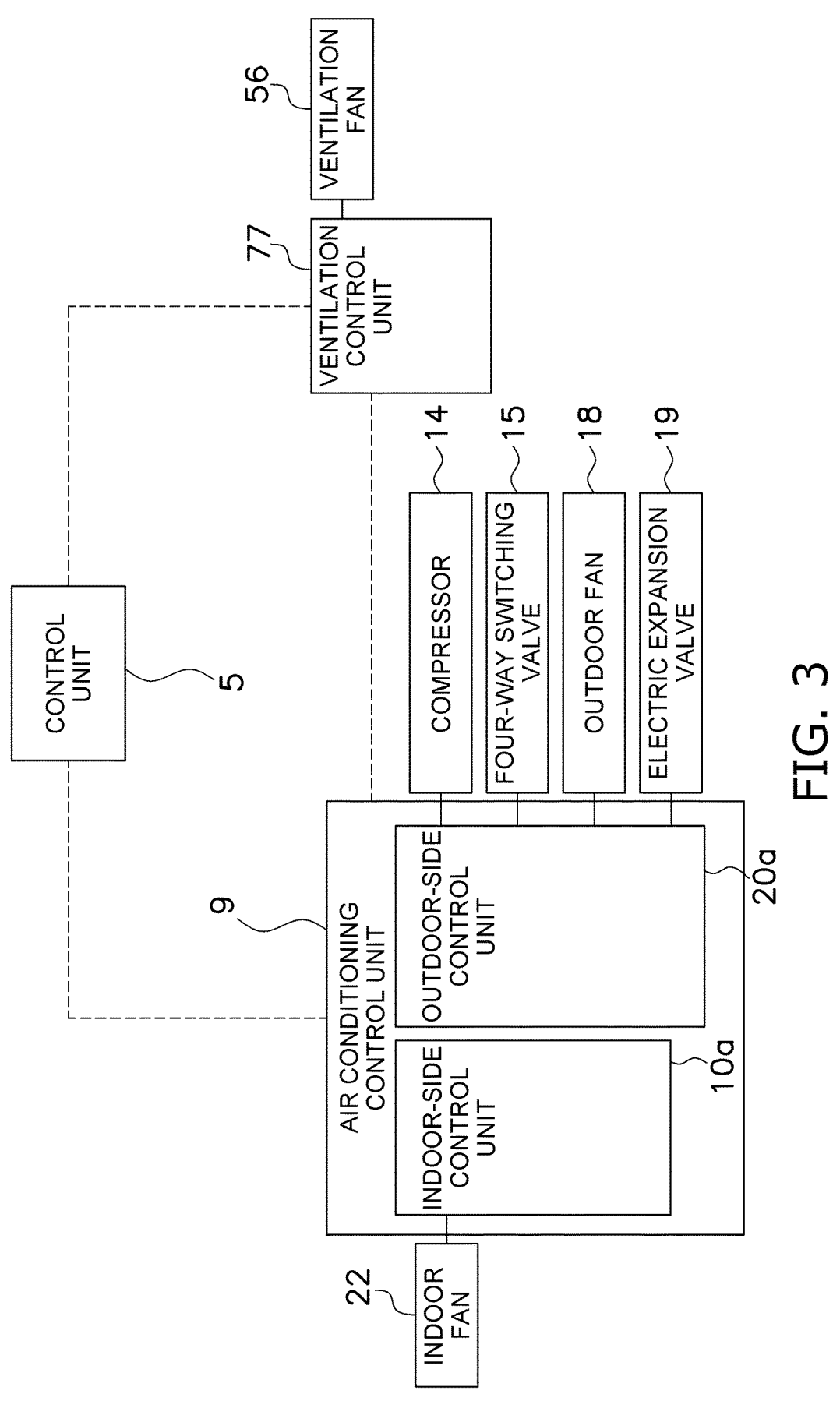
FIG. 3 is a control block diagram of the air conditioning ventilation system.

The air conditioner 1 will be described with reference to FIGS. 1 and 2. FIG. 2 is a diagram schematically illustrating an overall configuration of the air conditioning ventilation system 100. The air conditioner 1 performs air conditioning of the indoor space IS by performing a cooling operation, a heating operation, or a dehumidifying operation. The air conditioner 1 according to the embodiment is a device capable of performing the compensation operation. Hereinafter, a state in which the air conditioner 1 is performing the compensation operation may be referred to as a compensation operating mode. Furthermore, a state in which the air conditioner 1 is performing an operation other than the compensation operation may be referred to as a normal operating mode.

As illustrated in FIGS. 1 and 2, the air conditioner 1 mainly includes an outdoor unit 10 installed in an outdoor space OS (which corresponds to "outdoor" in the claims), and an indoor unit 20 attached to a wall WL or the like of the indoor space IS. The outdoor unit 10 and the indoor unit 20 are connected by refrigerant connection pipes 11 and 12. In the air conditioner 1, the outdoor unit 10 and the indoor unit 20 are connected by the refrigerant connection pipes 11 and 12 to constitute a refrigerant circuit 13 (see FIG. 2). The air conditioner 1 performs a vapor compression refrigeration cycle in which a refrigerant sealed in the refrigerant circuit 13 is compressed, condensed, decompressed, evaporated, and then compressed again.

The operation of the air conditioner 1 is controlled by the air conditioning control unit 9. The air conditioning control unit 9 is configured by connecting an outdoor-side control unit 10a and an indoor-side control unit 20a via a transmission line 8a, for example.

(2-1-1) Outdoor Unit

The outdoor unit 10 is a device installed in the outdoor space OS. The outdoor unit 10 mainly includes a compressor 14, a four-way switching valve 15, an accumulator 16, an outdoor heat exchanger 17, an outdoor fan 18, an electric expansion valve 19, and the outdoor-side control unit 10a.

The compressor 14 sucks the refrigerant from a suction pipe through a suction port, and compresses the sucked refrigerant. The compressed refrigerant is discharged from the compressor 14 through a discharge port. The refrigerant discharged from the compressor 14 is sent to a first port 15a of the four-way switching valve 15 through a discharge pipe.

The four-way switching valve 15 is a mechanism that switches a flow direction of the refrigerant. When the air conditioner 1 performs the cooling operation, the four-way switching valve 15 causes the refrigerant to flow between the first port 15a and a second port 15b and simultaneously causes the refrigerant to flow between a third port 15c and a fourth port 15d (see a solid line in FIG. 2). When the air conditioner 1 performs the heating operation, the four-way switching valve 15 causes the refrigerant to flow between the first port 15a and the fourth port 15d and simultaneously causes the refrigerant to flow between the second port 15b and the third port 15c (see a broken line in FIG. 2).

The accumulator 16 is provided in the suction pipe connecting the third port 15c of the four-way switching valve 15 and the suction port of the compressor 14. In the accumulator 16, the refrigerant flowing from the third port 15c of the four-way switching valve 15 to the compressor 14 is separated into a gas refrigerant and a liquid refrigerant. The gas refrigerant is mainly supplied from the accumulator 16 to the suction port of the compressor 14.

The outdoor heat exchanger 17 exchanges heat between outdoor air and refrigerant. The outdoor heat exchanger 17 functions as a condenser for the refrigerant during the cooling operation. The outdoor heat exchanger 17 functions as a condenser for the refrigerant during the heating operation. The outdoor heat exchanger 17 according to the embodiment is, for example, a fin-and-tube heat exchanger having a plurality of heat transfer tubes and a plurality of heat transfer fins.

The outdoor fan 18 is a fan that generates a flow of outdoor air flowing into the outdoor unit 10, passing through the outdoor heat exchanger 17, and flowing out to the outside of the outdoor unit 10. The outdoor fan 18 according to the embodiment is, for example, a propeller fan. The outdoor fan 18 is not limited to a propeller fan and may be appropriately selected.

The electric expansion valve 19 is a valve for adjusting a refrigerant pressure between the outdoor heat exchanger 17 and the indoor heat exchanger 21, adjusting a refrigerant flow rate, and the like. In the embodiment, the electric expansion valve 19 is adopted as an expansion mechanism, but the expansion mechanism is not limited to the electric expansion valve as long as being a mechanism capable of adjusting the refrigerant pressure, adjusting the refrigerant flow rate, and the like.

The outdoor-side control unit 10a controls an operation of each component constituting the outdoor unit 10.

The outdoor-side control unit 10a is implemented by a microcomputer, a memory, or the like. The microcomputer includes a control calculator and a storage. The control calculator may include a processor such as a central processing unit (CPU) or a graphics processing unit (GPU). The control calculator reads a program stored in the storage and performs predetermined calculation processing in accordance with the program. The control calculator can write a calculation result to the storage and read information stored in the storage in accordance with the program. The outdoor-side control unit 10a is electrically connected to the compressor 14, the four-way switching valve 15, the outdoor fan 18, the electric expansion valve 19, and the like included in the outdoor unit 10 so as to be able to transmit and receive control signals, information, and the like. The outdoor-side control unit 10a is connected to the indoor-side control unit 20a via the transmission line 8a so as to be able to transmit and receive control signals, information, and the like. The outdoor-side control unit 10a and the indoor-side control unit 20a are connected to constitute the air conditioning control unit 9 that controls the operation of the air conditioner 1.

(2-1-2) Indoor Unit

As illustrated in FIG. 1, the indoor unit 20 according to the embodiment is a wall-mounted indoor unit. However, the indoor unit 20 is not limited to this type, and the indoor unit 20 may be, for example, an indoor unit installed on a ceiling or a floor. The indoor unit 20 mainly includes the indoor heat exchanger 21, an indoor fan 22, and the indoor-side control unit 20a.

The indoor heat exchanger 21 exchanges heat between indoor air and refrigerant. The indoor heat exchanger 21 functions as a refrigerant evaporator and cools indoor air during the cooling operation. The indoor heat exchanger 21 functions as a condenser for the refrigerant and heats the indoor air during the heating operation. The indoor heat exchanger 21 according to the embodiment is, for example, a fin-and-tube heat exchanger having a plurality of heat transfer tubes and a plurality of heat transfer fins.

The indoor fan 22 is a fan that sucks indoor air into the indoor unit 20 and supplies air subjected to heat exchange with the refrigerant in the indoor heat exchanger 21 into the room. The indoor fan 22 according to the embodiment is a cross-flow fan that generates an air flow in a direction intersecting an axis by being rotationally driven. The indoor fan 22 is not limited to a cross-flow fan and may be appropriately selected.

The indoor-side control unit 20a controls the operation of each component constituting the indoor unit 20.

The indoor-side control unit 20a is implemented by a microcomputer, a memory, or the like. The microcomputer includes a control calculator and a storage. The control calculator may include a processor such as a CPU or a GPU. The control calculator reads a program stored in the storage and performs predetermined calculation processing in accordance with the program. The control calculator can write a calculation result to the storage and read information stored in the storage in accordance with the program. The indoor-side control unit 20a is electrically connected to the indoor fan 22 and the like so as to be able to transmit and receive control signals, information, and the like. The indoor-side control unit 20a is connected to the outdoor-side control unit 10a of the outdoor unit 10 via the transmission line 8a so as to be able to transmit and receive control signals, information, and the like. The indoor-side control unit 20a and the outdoor-side control unit 10a are connected to constitute the air conditioning control unit 9 that controls the operation of the air conditioner 1. Note that the indoor-side control unit 20a and the outdoor-side control unit 10a are not connected by the physical transmission line 8a, but may be connected to be communicable wirelessly.

The indoor-side control unit 20a is configured to be able to receive various signals transmitted from a remote controller 25 for operating the indoor unit 20. The various signals include signals related to operation and stop of the indoor unit 20 and signals related to various settings. The signals related to the various settings include, for example, a switching signal of the operating modes and target temperatures of the cooling operation and the heating operation.

The first wireless LAN adapter 101 is incorporated in the indoor unit 20 according to the embodiment (see FIG. 1). The indoor-side control unit 20a can communicate with the wireless LAN router 210 by using the first wireless LAN adapter 101.

(2-2) Ventilator

The ventilator 50 ventilates the indoor space IS by performing a ventilation operation described later. As illustrated in FIG. 1, the ventilator 50 according to the embodiment is attached to the wall WL of the indoor space IS. However, the ventilator 50 may be installed on a ceiling, a floor surface, or the like of the indoor space IS.

The ventilator 50 according to the embodiment mainly includes a ventilation fan 56 that generates an air flow for supplying air, a ventilation fan motor (not shown) that drives the ventilation fan 56, and a ventilation control unit 77 that controls start, stop, and a number of rotations (air volume) of the ventilation fan motor. Note that the configuration of the ventilator 50 is not limited to the above configuration, and the ventilator 50 may include, for example, a total heat exchanger or an active species generator.

The ventilation control unit 77 includes a microcomputer, a memory, and the like for controlling the operation of each component constituting the ventilator 50.

The second wireless LAN adapter 102 is incorporated in the ventilator 50 according to the embodiment (see FIG. 1). The ventilation control unit 77 can communicate with the wireless LAN router 210 by using the second wireless LAN adapter 102.

(2-3) Controller

The controller 86 is a device installed in the indoor space IS. The controller 86 mainly includes the indoor environment sensor 60, a notifier 23, and the control unit 5.

The indoor environment sensor 60 is a sensor unit capable of detecting environment of the indoor space IS. The indoor environment sensor 60 according to the embodiment is a $CO_2$ sensor capable of detecting a $CO_2$ concentration in the indoor space IS. The $CO_2$ concentration detected by the indoor environment sensor is transmitted to the control unit 5.

The control unit 5 is implemented by a microcomputer, a memory, or the like. The control unit 5 includes a control calculator and a storage. The control calculator of the control unit 5 may include a processor such as a CPU or a GPU. The control calculator of the control unit 5 reads a program stored in the storage and performs predetermined calculation processing in accordance with the program. The control calculator can write a calculation result to the storage and read information stored in the storage in accordance with the program. The storage can be used as database. The control unit 5 according to the embodiment transmits and receives control signals, information, and the like to and from the air conditioning control unit 9 and the ventilation control unit 77 to control the operation of the air conditioner 1 and the ventilator 50.

The notifier 23 is a device that notifies the user of a start and an end of the compensation operation. The notifier 23 according to the embodiment is, for example, a speaker incorporated in the controller 86. However, the example of the notifier 23 is not limited the speaker, and for example, the remote controller 25 including a display 250 may have a function as the notifier.

The third wireless LAN adapter 103 is incorporated in the controller 86 according to the embodiment (see FIG. 1). The control unit 5 can communicate with the wireless LAN router 210 by using the third wireless LAN adapter 103.

(2-4) Outdoor Sensor

As illustrated in FIG. 1, the outdoor sensor 70 is a sensor unit disposed in the outdoor space OS. The outdoor sensor 70 is a sensor unit capable of detecting a temperature of the outdoor space OS. The outdoor sensor 70 is connected to the controller 86 via a transmission line 8b so as to be able to transmit and receive various signals and information. The temperature of the outdoor space OS detected by the outdoor sensor 70 is transmitted to the control unit 5 of the controller 86 via the transmission line 8b.

(3) Ventilation Operation and Compensation Operation

Hereinafter, the ventilation operation performed by the ventilator 50 and the compensation operation performed by the air conditioner 1 will be described in detail.

(3-1) Ventilation Operation

The ventilation operation is an operation implemented by the ventilator 50 supplying the air of the outdoor space OS to the indoor space IS. When the ventilation operation is performed, the $CO_2$ concentration in the indoor space IS decreases.

In the embodiment, a start timing of the ventilation operation is determined by the control unit 5. The control unit 5 determines the start timing of the ventilation operation on the basis of a detection value of the indoor environment sensor 60. For example, the control unit 5 starts the ventilation operation when the detection value detected by the indoor environment sensor 60 as a $CO_2$ sensor exceeds a first threshold value. The first threshold value is a numerical value related to the $CO_2$ concentration, and is herein, for example, 1000 ppm. Therefore, the control unit 5 according to the embodiment starts the ventilation operation when the $CO_2$ concentration in the room exceeds 1000 ppm. The control unit 5 that has determined the start timing of the ventilation operation sends a control signal to the ventilation control unit 77 so as to start the ventilation operation at the start timing.

The ventilation operation according to the embodiment is continued until the $CO_2$ concentration in the room decreases to a predetermined concentration. For example, the ventilation operation is continued until the $CO_2$ concentration in the room becomes less than 800 ppm.

As described above, when the ventilation operation is performed, the air (outside air) in the outdoor space OS is supplied to the indoor space IS. At this time, there is a possibility that the outside air supplied to the indoor space IS may be air having a higher temperature or a lower temperature than the indoor air. For example, when the air conditioner 1 is performing the cooling operation (in a cooling season), there is a possibility that high-temperature outside air may be supplied to the indoor space IS along with the ventilation operation. Alternatively, when the air conditioner 1 is performing the heating operation (in a heating season), there is a possibility that low-temperature outside air may be supplied to the indoor space IS along with the ventilation operation. When high-temperature or low-temperature outside air is supplied to the indoor space IS, there is a possibility that the change may impair comfort of the user.

(3-2) Compensation Operation

The compensation operation is an operation performed prior to the ventilation operation. The compensation operation is an operation for compensating for a change in indoor temperature due to the ventilation operation. By performing the compensation operation, a temperature change of the indoor air accompanying the ventilation operation becomes moderate.

In the embodiment, a content of the compensation operation is determined by the control unit 5. The control unit 5 determines the content of the compensation operation on the basis of a detection value of the outdoor sensor 70. For example, the control unit 5 determines a second target temperature on the basis of the detection value of the outdoor sensor 70. The second target temperature is a target temperature different from a first target temperature set at the start (immediately before the start) of the compensation operation by a predetermined temperature. The compensation operation is performed on the basis of the second target temperature. Note that the first target temperature is substantially the same as a target temperature set in the normal operating mode. Therefore, it can be interpreted that the compensation operation is an operation performed prior to the ventilation operation and is an operation performed on the basis of a target temperature different by a predetermined temperature from the target temperature set in the normal operating mode.

For example, it is assumed that the outdoor temperature detected by the outdoor sensor 70 is 35° C., and the target temperature set in the air conditioner 1 at the start of the compensation operation is 27° C. (the first target temperature is 27° C.). As described above, in a case where there is a possibility that the temperature of the indoor air may rise due to the ventilation operation, the control unit 5 performs the compensation operation by performing the cooling operation based on the target temperature (for example, 24° C.) lower than the first target temperature by a predetermined temperature. Alternatively, it is assumed that the outdoor temperature detected by the outdoor sensor 70 is 5° C., and the target temperature set in the air conditioner 1 at the start of the compensation operation is 20° C. As described above, in a case where there is a possibility that the temperature of the indoor air may decrease due to the ventilation operation, the control unit 5 performs the compensation operation by performing the heating operation based on the target temperature (for example, 23° C.) higher than the first target temperature by a predetermined temperature. Note that these numerical values are examples and can be changed as appropriate.

A start timing of the compensation operation is determined by the control unit 5. The control unit 5 determines the start timing of the ventilation operation on the basis of the detection value of the indoor environment sensor 60. Specifically, the control unit 5 determines the start timing of the compensation operation on the basis of the CO2 concentration detected by the indoor environment sensor 60 as a CO2 sensor and a change rate of the CO2 concentration.

For example, when it is predicted that the CO2 concentration in the indoor space IS exceeds the first threshold value after ten minutes, the control unit 5 determines to execute the compensation operation after five minutes, for example. Note that these numerical values are examples and can be changed as appropriate.

With the fact that the CO2 concentration in the room exceeds the second threshold value as a trigger, the control unit 5 according to the embodiment predicts after how many minutes the CO2 concentration in the room exceeds the first threshold value (after how many minutes the ventilation operation is started) on the basis of the change rate of the CO2 concentration. The second threshold value is a numerical value related to the CO2 concentration, and is herein, for example, 950 ppm. The change rate of the CO2 concentration can be calculated by confirming a transition of the CO2 concentration in the indoor space IS. For example, the storage of the control unit 5 according to the embodiment stores in advance a program by which the control unit 5 confirms the detection value (CO2 concentration) of the indoor environment sensor 60 every five minutes. The CO2 concentration referred to by the control unit 5 is stored in the storage of the control unit 5 in chronological order. As a result, the storage of the control unit 5 stores the CO2 concentration 5 minutes before, the CO2 concentration 10 minutes before, and the CO2 concentration 15 minutes before, . . . . The control unit 5 can calculate the change rate of the CO2 concentration by performing predetermined calculation on the basis of the above data.

The control unit 5 that has determined the start timing of the compensation operation sends a control signal to the air conditioning control unit 9 so as to start the compensation operation at the start timing.

The compensation operation according to the embodiment ends on the basis of the start of the ventilation operation. For example, the compensation operation ends simultaneously with the start of the ventilation operation.

The control unit 5 may resume the normal operating mode after the end of the compensation operating mode.

(4) Operation of Air Conditioning Ventilation System

Figure 4:
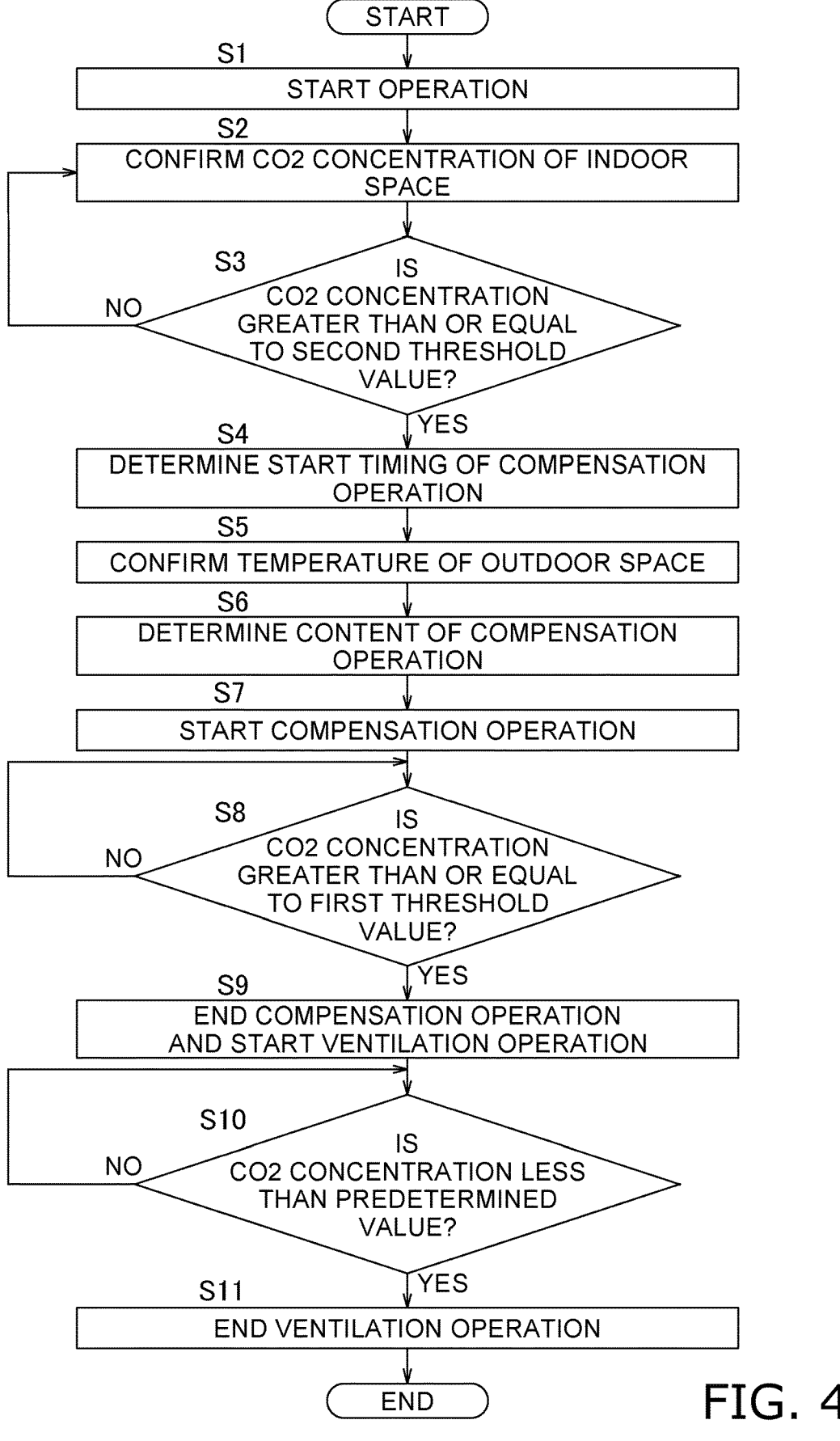
FIG. 4 is a flowchart illustrating a flow of processing performed by a control unit during a compensation operation and a ventilation operation.

Next, an operation of the air conditioning ventilation system 100 according to the embodiment will be described. The air conditioning ventilation system 100 that has received an operation command from the user is controlled by the control unit 5 to operate in a flow as illustrated in a flowchart of FIG. 4. Hereinafter, the operation of the air conditioning ventilation system 100 will be described with reference to the flowchart illustrated in FIG. 4. Note that the flow of the flowchart illustrated in FIG. 4 is merely an example, and may be appropriately changed within a range without contradiction. For example, other steps not illustrated may be included before and after each step, and the order of the steps may be appropriately changed within a range not contradictory to each other.

In step S1, the air conditioning ventilation system 100 starts the operation of the air conditioner 1. Specifically, the normal operating mode is started.

In step S2, the air conditioning ventilation system 100 confirms the detection value of the indoor environment sensor 60. Specifically, the air conditioning ventilation system 100 confirms the CO2 concentration in the indoor space IS.

In step S3, the air conditioning ventilation system 100 determines whether the CO2 concentration in the indoor space IS is greater than or equal to the second threshold value. When the $CO_2$ concentration in the indoor space IS is greater than or equal to the second threshold value, the air conditioning ventilation system 100 proceeds to step S4. When the $CO_2$ concentration in the indoor space IS is less than the second threshold value, the air conditioning ventilation system 100 returns to step S2.

In step S4, the air conditioning ventilation system 100 determines the start timing of the compensation operation on the basis of the change rate of the $CO_2$ concentration in the indoor space IS.

In step S5, the air conditioning ventilation system 100 confirms the detection value of the outdoor sensor 70. Specifically, the air conditioning ventilation system 100 confirms the temperature of the outdoor air.

In step S6, the air conditioning ventilation system 100 determines the content of the compensation operation on the basis of the detection value of the outdoor sensor 70.

In step S7, the air conditioning ventilation system 100 compares the start timing determined in step S4 with a current time. The air conditioning ventilation system 100 starts the compensation operation when the current time coincides with the start timing determined in step S4. In step S7, the notifier 23 notifies the user of the start of the compensation operation.

In step S8, the air conditioning ventilation system 100 determines whether the $CO_2$ concentration in the indoor space IS is greater than or equal to the first threshold value on the basis of the detection value of the indoor environment sensor 60. When the $CO_2$ concentration in the indoor space IS is greater than or equal to the first threshold value, the air conditioning ventilation system 100 proceeds to step S9. When the $CO_2$ concentration in the indoor space IS is less than the first threshold value, the air conditioning ventilation system 100 continues the compensation operation until the $CO_2$ concentration in the indoor space IS becomes greater than or equal to the first threshold value.

In step S9, the air conditioning ventilation system 100 ends the compensation operation and starts the ventilation operation. In step S9, the notifier 23 notifies the user of the end of the compensation operation.

In step S10, the air conditioning ventilation system 100 confirms whether the $CO_2$ concentration in the room is less than a predetermined value. When the $CO_2$ concentration in the room is less than the predetermined value, the air conditioning ventilation system 100 proceeds to step S11. When the $CO_2$ concentration in the room is greater than or equal to the predetermined value, the air conditioning ventilation system 100 continues the ventilation operation until the $CO_2$ concentration in the room becomes less than the predetermined value.

In step S11, the air conditioning ventilation system 100 ends the ventilation operation.

In this manner, the operation of the air conditioning ventilation system 100 is performed. The air conditioning ventilation system 100 that has performed the operation in step S11 may repeat the operations in steps S2 to S11 until receiving an operation end command from the user.

(5) Characteristics

When a ventilation operation is performed by using a ventilator, there is a possibility that outside air supplied to an air conditioning target space along with ventilation may change temperature of air in the air conditioning target space.

To solve such a problem, there is conventionally known an air conditioner as disclosed in Patent Literature 1 that controls an air conditioning capacity according to a temperature of supplied outdoor air when the outdoor air is supplied to the air conditioning target space.

However, in the air conditioner disclosed in Patent Literature 1, the air conditioning capacity is controlled when the outdoor air is supplied. Therefore, the temperature of the air conditioning target space temporarily changes, and there is a possibility that the change may impair comfort of the user. In particular, immediately after the supply of outdoor air is started, there is a possibility that the temperature of the air conditioning target space may change significantly.

(5-1)

The air conditioning ventilation system 100 according to the embodiment includes the air conditioner 1, the ventilator 50, and the control unit 5. The control unit 5 controls the operations of the air conditioner 1 and the ventilator 50. The control unit 5 causes the air conditioner 1 to perform the compensation operation prior to the ventilation operation to be performed by the ventilator 50. The compensation operation is an operation for compensating for a change in indoor temperature due to the ventilation operation.

The control unit 5 of the air conditioning ventilation system 100 according to the embodiment performs the compensation operation for compensating for a change in the indoor temperature due to the ventilation operation. The compensation operation is performed prior to the ventilation operation. This configuration can adjust the temperature of the indoor air in advance in accordance with the temperature of the air introduced along with the ventilation operation. Thus, even when the outdoor air is supplied to the indoor space IS along with the ventilation operation, the temperature change of the indoor air becomes moderate. Therefore, comfort of a user is maintained.

(5-2)

As described above, there is a possibility that the ventilation operation may change the temperature of the indoor air. Thus, from the viewpoint of stabilizing the temperature of the indoor air, the ventilation operation is preferably performed less frequently. However, in Patent Literature 1, the timing at which the ventilation operation is performed has not been studied in detail. For this reason, in the air conditioner according to Patent Literature 1, there is a possibility that the ventilation operation may be performed at a timing at which it is supposed to be unnecessary to perform the ventilation operation.

The air conditioning ventilation system 100 according to the embodiment further includes the indoor environment sensor 60 that detects an indoor environment. The control unit 5 determines the start timing of the ventilation operation on the basis of the detection value of the indoor environment sensor 60.

This configuration allows the control unit 5 to start the ventilation operation at an appropriate timing. It is therefore possible to minimize a frequency at which the temperature change of the indoor air occurs. Accordingly, the temperature of the indoor air is stabilized.

The stabilization of the temperature of the indoor air maintains the comfort of the user.

(5-3)

The air conditioning ventilation system 100 according to the embodiment further includes the indoor environment sensor 60 that detects the indoor environment. The control unit 5 determines the start timing of the compensation operation on the basis of the detection value of the indoor environment sensor 60.

This configuration allows the control unit 5 to start the compensation operation at an appropriate timing.

(5-4)

The air conditioning ventilation system 100 according to the embodiment further includes the outdoor sensor 70 that detects the outdoor temperature. The control unit 5 determines the content of the compensation operation on the basis of a detection value of the outdoor sensor 70.

This configuration allows the control unit 5 to determine the content of the compensation operation on the basis of the outdoor temperature.

(5-5)

The indoor environment changes under an influence of various factors. Therefore, when the start timing of the compensation operation is uniformly determined, operation time of the compensation operation is considered to be excessively long or insufficient. When the operation time of the compensation operation is excessively long, there is a risk of causing an increase in power consumption. In addition, when the operation time of the compensation operation is insufficient, there is a possibility that the outdoor air may be started to be supplied in a state where the adjustment of the air temperature of the indoor space IS is insufficient.

In the air conditioning ventilation system 100 according to the embodiment, the control unit 5 determines the start timing of the compensation operation on the basis of the detection value of the indoor environment sensor 60 and the change rate of the detection value of the indoor environment sensor 60.

This configuration allows the control unit 5 to start the compensation operation at an appropriate timing. Specifically, the control unit 5 can start the compensation operation at a timing at which the operation time of the compensation operation does not become excessively long. In addition, the control unit 5 can start the compensation operation at a timing at which the operation time of the compensation operation does not become insufficient.

In the air conditioning ventilation system 100 according to the embodiment, the compensation operation is a cooling operation or a heating operation based on the second target temperature different by a predetermined temperature from the first target temperature set at the start of the compensation operation.

This configuration allows the compensation operation to be performed at a target temperature higher or lower than the target temperature set at the start of the compensation operation.

(5-7)

In the air conditioning ventilation system 100 according to the embodiment, the control unit 5 ends the compensation operation on the basis of the start of the ventilation operation.

(5-8)

The air conditioning ventilation system 100 according to the embodiment further includes the notifier 23 that notifies the user of the start and the end of the compensation operation.

(6) Modifications

Modifications of the above embodiment will be described below. Any of the following modifications may be combined where appropriate within a range causing no contradiction.

(6-1) Modification 1A

In the above embodiment, an example has been described in which the control unit 5 causes the air conditioner 1 to perform the compensation operation to moderate the change in the temperature of the indoor air due to the ventilation operation. However, the example of the compensation operation is not limited to this example. For example, when there is a possibility that outdoor air having high humidity may be supplied to the indoor space IS along with the ventilation operation, the following operation may be performed.

(6-1-1)

For example, the control unit 5 may cause the air conditioner 1 to perform the compensation operation to moderate the change in the humidity of the indoor air due to the ventilation operation. In the compensation operation according to this modification, the dehumidifying operation may be performed. Here, the outdoor sensor 70 may be a sensor that detects outdoor humidity.

Even when the outdoor air is supplied to the indoor space IS along with the ventilation operation, the air conditioning ventilation system according to this modification can moderate the change in the humidity of the indoor air. Therefore, comfort of a user is maintained.

(6-1-2)

For example, the control unit 5 may cause the air conditioner 1 to perform the compensation operation to moderate the change in the indoor temperature and humidity due to the ventilation operation. In the compensation operation according to this modification, the cooling operation or the heating operation and the dehumidifying operation may be performed. For example, in the compensation operation according to this modification, the cooling operation may be performed for a predetermined time after the dehumidifying operation is performed for a predetermined time. Here, the outdoor sensor 70 may be a sensor that detects outdoor temperature and humidity.

Even when the outdoor air is supplied to the indoor space IS along with the ventilation operation, the air conditioning ventilation system according to this modification can moderate the changes in the temperature and humidity of the indoor air. Therefore, comfort of a user is maintained.

(6-2) Modification 1B

In the above embodiment, an example has been described in which the control unit 5 determines the start timing of the compensation operation on the basis of the detection value of the indoor environment sensor 60 and the change rate of the detection value of the indoor environment sensor 60. However, an example of control by the control unit 5 should not be limited to the above example. For example, the control unit 5 may start the compensation operation when the detection value of the indoor environment sensor 60 exceeds the second threshold value, and may start the ventilation operation when the detection value of the indoor environment sensor 60 exceeds the first threshold value higher than the second threshold value.

For example, it is assumed that the second threshold value is 950 ppm and the first threshold value is 1000 ppm. In this case, the control unit 5 starts the compensation operation when the $CO_2$ concentration exceeds 950 ppm, and starts the ventilation operation when the $CO_2$ concentration exceeds 1000 ppm.

(6-3) Modification 1C

In the above embodiment, an example has been described in which the control unit 5 ends the compensation operation simultaneously with the start of the ventilation operation. However, the example of the control by the control unit 5 is not limited to the above example, and the control unit 5 may end the compensation operation after a predetermined time has elapsed from the start of the ventilation operation. In this case, the control unit 5 may confirm whether the predetermined time has elapsed from the start of the ventilation operation by measuring with a timer (not shown) or the like.

Alternatively, the control unit 5 may end the compensation operation on the basis of the elapsed time from the start of the compensation operation. Specifically, the compensation operation may be terminated after a predetermined time has elapsed from the start of the compensation operation. In this case, the control unit 5 may confirm whether the predetermined time has elapsed from the start of the compensation operation by measuring with a timer (not shown) or the like.

Alternatively, the control unit 5 may end the compensation operation on the basis of the detection value of the indoor environment sensor 60. For example, the control unit 5 may end the compensation operation when the detection value of the indoor environment sensor 60 does not increase after a predetermined time has elapsed from the start of the compensation operation.

(6-4) Modification 1D

Figure 5:
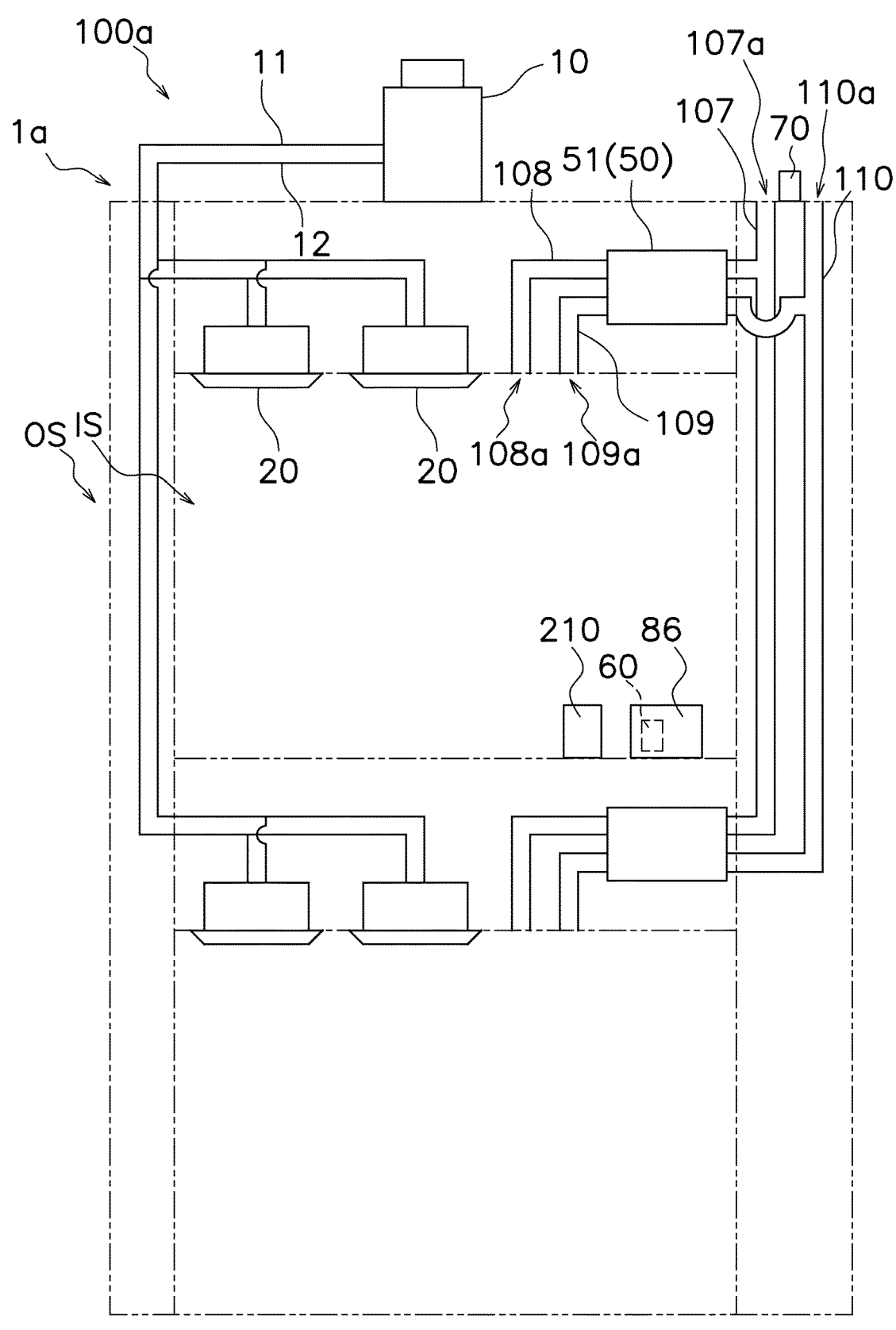
FIG. 5 is a schematic diagram of the air conditioning ventilation system.

In the above embodiment, the paired air conditioner 1 in which one outdoor unit and one indoor unit are connected in parallel by the refrigerant connection pipes 11 and 12 has been described. However, the configuration of the air conditioner is not limited to the above configuration. For example, the air conditioner may be a multi-type air conditioner 1a in which a plurality of indoor units 20 is connected to one outdoor unit 10 (see FIG. 5).

In the above embodiment, the ventilator 50 communicating with the outdoor space OS has been described. However, the configuration of the ventilator is not limited to the above configuration. For example, the ventilator 50 may include a device body 51 connected to an intake duct 107 connected to an intake port 107a for taking the outdoor air into the indoor space IS, an air supply duct 108 connected to an air supply port 108a for supplying the outdoor air to the indoor space IS, an extraction duct 109 connected to an extraction port 109a for extracting the indoor air from the indoor space IS, and an exhaust duct 110 connected to a discharge port 110a for discharging the indoor air to the outdoor space OS (see FIG. 5).

(6-5) Modification 1E

In the above embodiment, an example has been described in which the air conditioning ventilation system 100 includes the indoor environment sensor 60, and the control unit 5 of the air conditioning ventilation system 100 determines the start timing of the compensation operation on the basis of the detection value of the indoor environment sensor 60 and the change rate of the detection value of the indoor environment sensor 60. In the above embodiment, an example has been described in which the control unit 5 starts the ventilation operation when the $CO_2$ concentration detected by the indoor environment sensor 60 exceeds the first threshold value. However, the configuration of the air conditioning ventilation system 100 is not limited to the above configuration, and the air conditioning ventilation system is not required to include the indoor environment sensor 60, for example. In this case, the start timing of the compensation operation and the ventilation operation may be stored in advance in the storage of the control unit 5.

For example, the storage of the control unit 5 may store a program that causes the ventilator 50 to perform the ventilation operation every time a predetermined time elapses. Specifically, the storage of the control unit 5 may store a program that causes the ventilation operation to be performed once per hour. The storage of the control unit 5 may store a program that causes the compensation operation to be performed ten minutes before the ventilation operation.

Furthermore, the storage of the control unit 5 may store in advance an execution time (for example, ten minutes) of the ventilation operation and an execution time (for example, five minutes) of the compensation operation.

The air conditioning ventilation system according to this modification does not include the indoor environment sensor 60. Therefore, a manufacturing cost of the air conditioning ventilation system is reduced.

(6-6) Modification 1F

In the above embodiment, an example has been described in which the air conditioning ventilation system 100 includes the indoor environment sensor 60, and the control unit 5 of the air conditioning ventilation system 100 determines the start timing of the compensation operation on the basis of the detection value of the indoor environment sensor 60 and the change rate of the detection value of the indoor environment sensor 60. However, the configuration of the air conditioning ventilation system 100 is not limited to the above configuration. The air conditioning ventilation system may include, for example, a human sensor capable of detecting the number of users present in the indoor space IS, instead of the indoor environment sensor 60. In this case, the control unit 5 may schematically calculate the $CO_2$ concentration in the indoor space IS on the basis of the number of users present in the indoor space IS, a staying time length of each user present in the indoor space IS, a floor area of the indoor space IS, and the like. The start timing of the compensation operation and the ventilation operation may be determined on the basis of the $CO_2$ concentration in the indoor space IS calculated by the control unit 5.

Alternatively, the air conditioning ventilation system may further include a human sensor in addition to the indoor environment sensor 60. In this case, the control unit 5 may consider the number of users present in the indoor space IS when calculating the change rate of the detection value of the indoor environment sensor 60. This configuration can correct the change rate of the detection value of the indoor environment sensor 60 in accordance with an increase or decrease of the user present in the indoor space IS. It is therefore possible to start the compensation operation at an appropriate timing.

(6-7) Modification 1G

In the above embodiment, an example has been described in which the ventilator 50 is installed in the indoor space IS and the ventilator 50 performs the ventilation operation. However, the configuration of the air conditioning ventilation system 100 is not limited to the above configuration. For example, the ventilator 50 may be integrated with the air conditioner.

The air conditioner according to this modification may include an outdoor unit including the ventilator 50 and an suction and exhaust hose, for example. The suction and exhaust hose is a hose that allows the indoor space IS and the outdoor unit to communicate with each other, and serves as a passage for an air flow generated by the ventilator 50. The air conditioner can supply the outdoor air to the indoor space IS through the suction and exhaust hose by driving the ventilator 50 included in the outdoor unit.

(6-8) Modification 1H

In the above embodiment, an example has been described in which the controller 86 includes the control unit 5. However, the configuration of the air conditioning ventilation system 100 is not limited to the above configuration. For example, the air conditioner 1 or the ventilator 50 may include the control unit 5. The control unit 5 is not required to have some or all of the functions described in the above embodiment. For example, some or all of the functions of the control unit 5 described in the above embodiment may be implemented by a server or the like installed in a place different from the air conditioning ventilation system. In other words, the functions of the control unit 5 is not required to be executed only by the air conditioning ventilation system, and may be implemented by a server (not shown) or the like installed separately from the air conditioning ventilation system.

(6-9) Modification 1I

In the above embodiment, an example has been described in which the air conditioning control unit 9, the ventilation control unit 77, and the control unit 5 mutually transmit and receive control signals, information, and the like by performing wireless communication via the wireless LAN router 210. However, an example of the air conditioning ventilation system is not limited to this example. For example, the air conditioning control unit 9, the ventilation control unit 77, and the control unit 5 may be connected by physical wires (communication lines). The air conditioning control unit 9, the ventilation control unit 77, and the control unit 5 may mutually transmit and receive control signals, information, and the like via physical wires.

Other Embodiments

The embodiments according to the present disclosure have been described above. Various modifications to modes and details will be available without departing from the object and the scope of the claims.

The present disclosure is not limited to the embodiments without any change. The present disclosure can be embodied, upon implementation, with any modification to any constituent element within a range not departing from the gist. The present disclosure can be presented in various manners with appropriate combinations of a plurality of constituent elements disclosed in the respective embodiments. For example, some may be excluded from all the constituent elements according to the embodiments. Furthermore, constituent elements according to different embodiment may be combined with each other as appropriate. Therefore, it should be considered that the present embodiments are merely examples in all respects and are not limiting, and it is intended that any modification obvious to a person skilled in the art is included in the embodiments.

The invention claimed is:

1. An air conditioning ventilation system comprising:
an air conditioner;
a ventilator; and
a control unit configured to control operations of the air conditioner and the ventilator,
the control unit being configured to cause the air conditioner to perform a compensation operation in order to compensate for a change in at least one of indoor temperature and humidity due to a ventilation operation prior to the ventilation operation to be performed by the ventilator; and
an indoor environment sensor configured to detect an indoor environment,
the control unit being configured to determine a start timing of the ventilation operation based on a detection value of the indoor environment sensor,
the control unit being configured to start the compensation operation when the detection value of the indoor environment sensor exceeds a second threshold value, and
the control unit being configured to start the ventilation operation when the detection value of the indoor environment sensor exceeds a first threshold value higher than the second threshold value.

2. The air conditioning ventilation system according to claim 1, wherein
the control unit is configured to determine a start timing of the compensation operation based on a detection value of the indoor environment sensor.

3. The air conditioning ventilation system according to claim 1, further comprising:
an outdoor sensor configured to detect at least one of outdoor temperature and humidity,
the control unit being configured to determine a content of the compensation operation based on a detection value of the outdoor sensor.

4. The air conditioning ventilation system according to claim 1, wherein
the control unit is configured to determine a start timing of the compensation operation based on the detection value of the indoor environment sensor and a change rate of the detection value of the indoor environment sensor.

5. The air conditioning ventilation system according to claim 4, wherein
the control unit is configured to end the compensation operation based on a start of the ventilation operation, based on an elapsed time from the start of the compensation operation, or based on the detection value of the indoor environment sensor.

6. The air conditioning ventilation system according to claim 1, wherein
the control unit is configured to end the compensation operation based on a start of the ventilation operation, based on an elapsed time from the start of the compensation operation, or based on the detection value of the indoor environment sensor.

7. The air conditioning ventilation system according to claim 1, wherein
the compensation operation is a cooling operation, a dehumidifying operation, or a heating operation based on a second target temperature different by a predetermined temperature from a first target temperature set at a start of the compensation operation.

8. The air conditioning ventilation system according to claim 1, further comprising:
a notifier configured to notify a user of at least one of a start and an end of the compensation operation.

9. An air conditioning ventilation system comprising:
an air conditioner;
a ventilator;
a control unit configured to control operations of the air conditioner and the ventilator; and
an indoor environment sensor configured to detect an indoor environment,
the control unit being configured to cause the air conditioner to perform a compensation operation in order to compensate for a change in at least one of indoor temperature and humidity due to a ventilation operation prior to the ventilation operation to be performed by the ventilator,
the control unit being configured to determine a start timing of the compensation operation based on a detection value of the indoor environment sensor,
the control unit being configured to start the compensation operation when the detection value of the indoor environment sensor exceeds a second threshold value, and
the control unit being configured to start the ventilation operation when the detection value of the indoor environment sensor exceeds a first threshold value higher than the second threshold value.

10. The air conditioning ventilation system according to claim 9, further comprising:

an outdoor sensor configured to detect at least one of outdoor temperature and humidity, the control unit being configured to determine a content of the compensation operation based on a detection value of the outdoor sensor.

11. The air conditioning ventilation system according to claim 9, wherein the control unit is configured to determine a start timing of the compensation operation based on the detection value of the indoor environment sensor and a change rate of the detection value of the indoor environment sensor.

12. The air conditioning ventilation system according to claim 11, wherein the control unit is configured to end the compensation operation based on a start of the ventilation operation, based on an elapsed time from the start of the compensation operation, or based on the detection value of the indoor environment sensor.

13. The air conditioning ventilation system according to claim 9, wherein the control unit is configured to end the compensation operation based on a start of the ventilation operation, based on an elapsed time from the start of the compensation operation, or based on the detection value of the indoor environment sensor.

14. The air conditioning ventilation system according to claim 9, wherein the compensation operation is a cooling operation, a dehumidifying operation, or a heating operation based on a second target temperature different by a predetermined temperature from a first target temperature set at a start of the compensation operation.

\* \* \* \* \*